United States Patent [19]

Hurst

[11] 4,022,308
[45] May 10, 1977

[54] DRIVE COUPLING AND CLUTCHES

[75] Inventor: John W. Hurst, Port Huron, Mich.

[73] Assignee: Chrysler Corporation, Highland Park, Mich.

[22] Filed: Apr. 23, 1976

[21] Appl. No.: 679,528

[52] U.S. Cl. .............................. 192/21; 192/48.91; 192/54; 192/93 A
[51] Int. Cl.² .................. F16D 21/00; F16D 13/26; F16D 43/20
[58] Field of Search ......... 192/21, 48.91, 51, 93 A, 192/54

[56] References Cited

UNITED STATES PATENTS

| | | | |
|---|---|---|---|
| 3,703,226 | 11/1972 | Strehler et al. | 192/54 X |
| 3,901,361 | 8/1975 | Brownlie | 192/21 |
| 3,946,841 | 3/1976 | LaFollette et al. | 192/21 X |
| 3,977,503 | 8/1976 | Hurst | 192/21 |

Primary Examiner—Allan D. Hermann
Attorney, Agent, or Firm—Talburtt & Baldwin

[57] ABSTRACT

Corresponding sets of radially distributed helical surfaces in a cone clutch axially urge movable cone members selectively into engagement with either of two mating cone members thereby enabling a clutch output member or members to be driven in either rotary direction.

8 Claims, 7 Drawing Figures

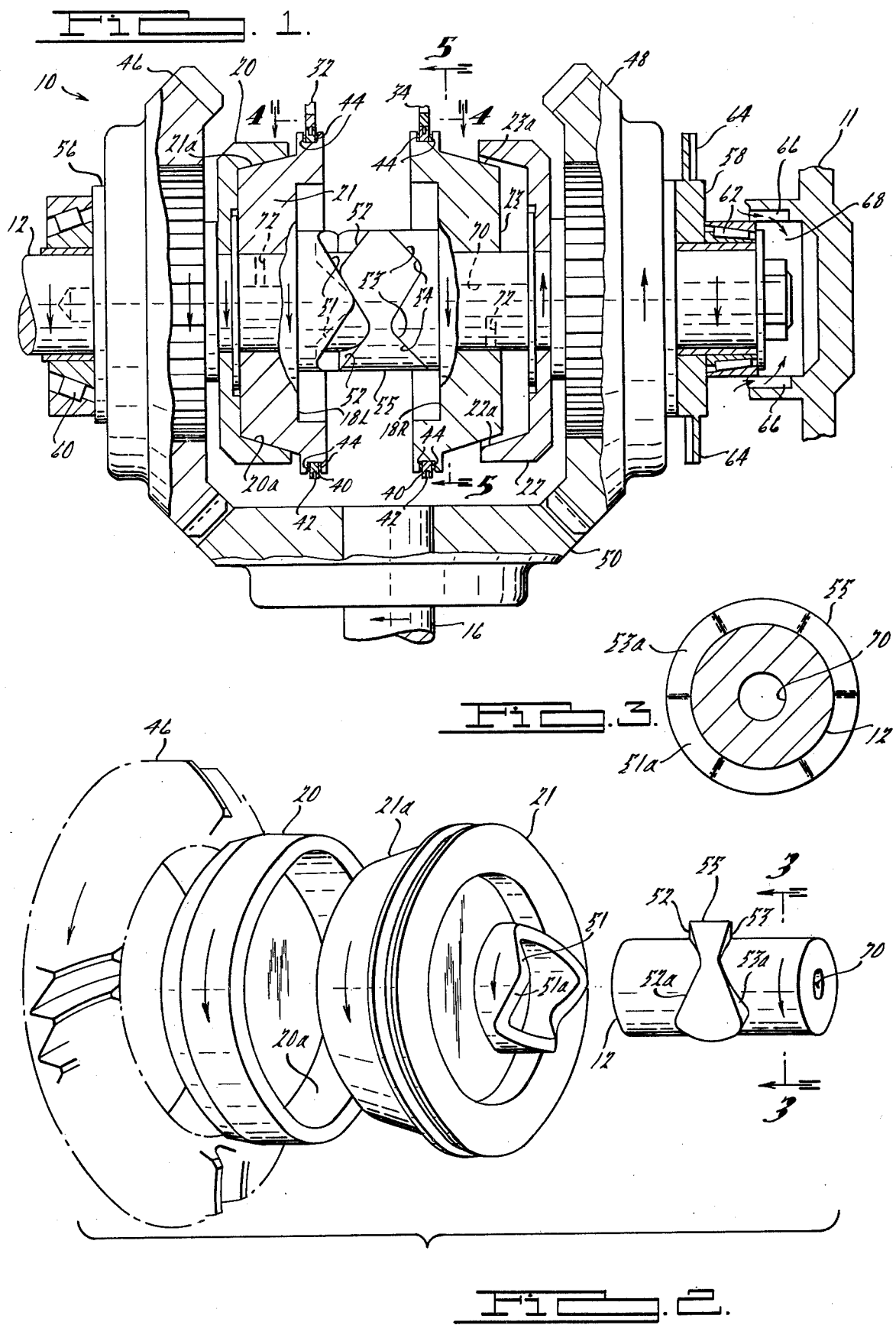

DRIVE COUPLING AND CLUTCHES

BACKGROUND OF THE INVENTION

The invention relates to drive couplings and more particularly to clutches. In its most preferred form it comprises a cone clutch or reversing drive coupling for inboard-outboard marine drive units such as the type shown in U.S. Pat. No. 3,893,407 for example or for outboard motors and other drive devices.

Previous marine drive devices have included various types of dog clutches and cone clutches. Some have been designed for actuation to be effected on a helical or spirally extending spline as shown in U.S. Pat. Nos. 3,212,349 and 3,269,497. However, this invention is most closely related to the subject matter of co-pending application Ser. No. 598,313, filed July 23, 1975, now U.S. Pat. No. 3,977,503. This invention represents an alternate form of the coupling disclosed in the co-pending application. Another related co-pending application is the one entitled "Bidirectional Drive Coupling" filed of even date herewith.

SUMMARY OF THE INVENTION

In the preferred embodiment of this invention, corresponding radially distributed helical camming surfaces abut in axial overlapping relationship on portions of a shaft and portions of an axially movable cone member carried by the shaft whereby two separate sets of camming surfaces therebetween are able to drivingly engage when the shaft is rotated and the cone member is moved axially to contact a mating cone member. Upon rotation of the mating cone member by the just mentioned cone member, driving engagement of the axially overlapping helical cam surfaces of the abutting just mentioned cone member and the shaft occurs due to a lagging in a rotary motion of the cone member relative to that of the shaft. The mating cone member is arranged to provide rotation to an output means. In addition, the camming surfaces coact to urge the first cone member into positive engagement with the mating cone member and the shaft.

THE DRAWING

FIG. 1 is a side elevational view in section of a reversing clutch embodying various features of the invention. It is particularly designed for use in an inboard-outboard marine drive unit or in an outboard motor.

FIG. 2 is an exploded detail perspective view of portions of the reversing clutch of FIG. 1 showing the helical surfaces on abutting portions of a male cone member and the input shaft.

FIG. 3 is a fragmentary sectional view taken along line 3—3 of FIG. 2.

PREFERRED EMBODIMENTS

FIGS. 1 – 5

Figure 4:
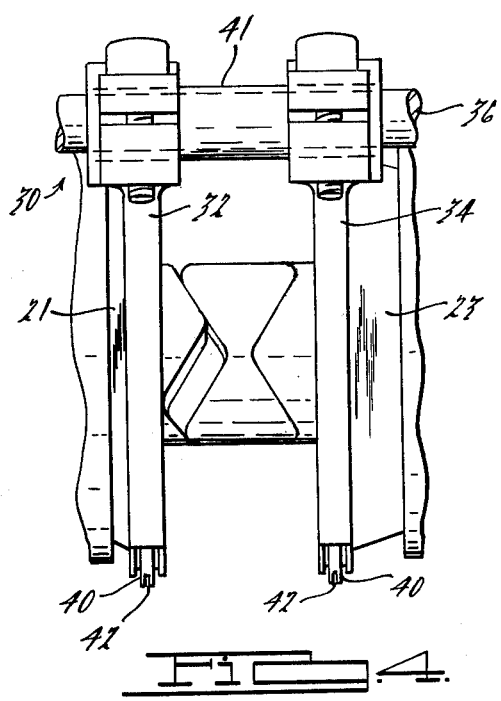
FIG. 4 is a fragmentary plane view of an upper portion of FIG. 1 taken from line 4—4 in FIG. 1.

The figures, particularly FIG. 1, show a reversing clutch generally designated 10, such as may be included in the outboard power leg of an inboard-outboard marine propulsion unit or stern drive having an upper housing portion 11 (shown fragmentarily) on an outboard power leg (not shown). Such arrangements are well known and are described in the aforementioned patents. As is conventional in such units, a rotatable input shaft 12 is connected to a rotatable output shaft 16 of an inboard mounted engine. Rotation of input shaft 12 drives an output shaft 16. Output shaft 16 is conventionally adapted to drive a propeller carried on a lower portion of the outboard power leg (not shown). Unidirectionally rotated input shaft 12 carries various clutch members and elements, described below in detail, which coact in combination to provide a reversible rotary output to output shaft 16, which is then capable of selectively driving a propeller on the power leg in either of two reverse rotary directions.

Shaft 12 carries a first pair of rotary clutch elements or female cone members 20 and 22 having frusto-conical concave interior rim portions or engagement faces 20a and 22a, respectively. Female cone members 20 and 22 are both mounted on shaft 12 so that they may partially rotate freely thereon within the limits of their engagement with other members and are axially retained in an axial location on the shaft.

Also carried by shaft 12 and rotatable thereon is a second pair of rotary clutch elements or male cone members 21 and 23, each having opposing frusto-conical convex engagement faces 21a and 23a, respectively.

Male cone members 21 and 23 are arranged to be rotatable and axially movable on shaft 12 over a range of travel such that either surface 21a or 23a may be selectively brought into engagement with surface 20a or 22a, respectively, by axially moving either of the male cone members. Also, the male cone members may be axially placed on shaft 12 in an intermediate position between the two female cone members such that no engagement is made with either of them.

The above described arrangement provides a cone clutch. As is the case with many clutches, this one is preferably carried inside a housing 11 which contains a substantial amount of oil. Consequently, the clutch members may be partially or wholly immersed in lubricating oil (not shown). It is therefore preferred that either the engagement faces of 20a and 22a or the engagement faces of 21a and 23a be provided with a plurality of small grooves (not shown) arranged to wipe oil from therebetween when any of the faces of these members come into mutual contact during operation of the clutch. This may be further understood as to purpose and arrangement by reference to the discussion contained in the Society of Automotive Engineers paper No. 311B entitled *Automatic Transmission Friction Elements* by Froslie, Milek and Smith, which was delivered at the SAE meeting of Jan. 9–13, 1964, with particular reference to pp. 2–3 thereof.

Figure 5:
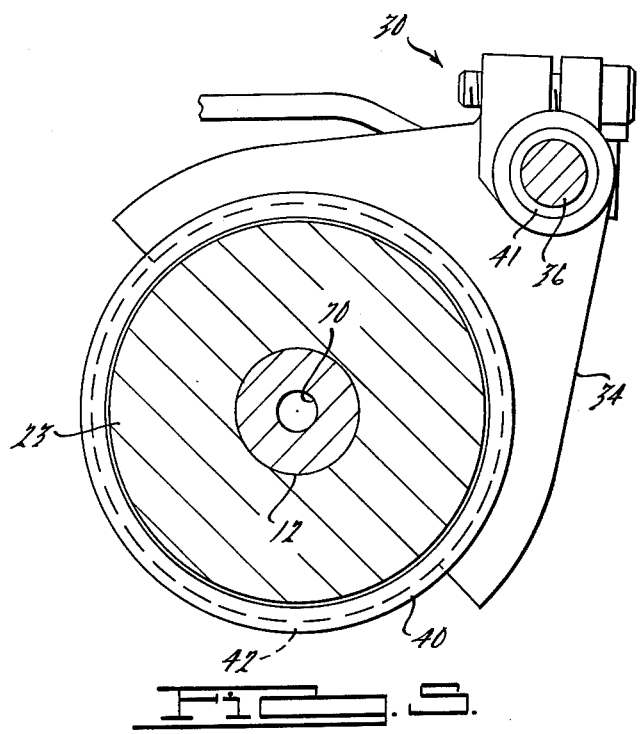
FIG. 5 is a fragmentary plan view taken along line 5—5 of FIG. 1.

Male cone members 21 and 23 are provided with a shaft control means generally designated 30 (best seen in FIGS. 4 and 5) holding the two male cones together and in a fixed axial position on shaft 12 relative to each other. Another purpose of means 30 is for selectively moving either of the male cone members into and out of contact with the female cone members. Preferably, means 30 takes the form of a pair of arcuate fork members 32 and 34 slidably mounted on a rail 36. Each of the fork members is connected to one of the male cones as shown in FIGS. 1, 4 and 5. In the preferred arrangement shown in the drawings, each male cone carries a ring 40 having an annular groove 42. Rings 40 are positioned on the male cone member portions between two annularly distributed sets of needle bearings indicated at 44 which facilitate rotation of the ring 40 relative to its corresponding female cone between the forks and the clutch members which receives them. The making and breaking of contact between male cone member and the respective female cone member is facilitated with less effort by use of such a bearing arrangement. The bifurcated portion of fork members 32 and 34 such as 34a and 34b shown in FIG. 5, fit into grooves 42 on rings 40 thereby connecting the fork members to respective male cone member portions. Means 30 is preferably designed to provide a simultaneous movement of the forks and male cone members as by tying the two forks together for simultaneous movement through a sleeve 41 which slides on rail 36. The forks may be attached to the sleeve by bolts as shown in FIGS. 4 and 5.

Figure 6:
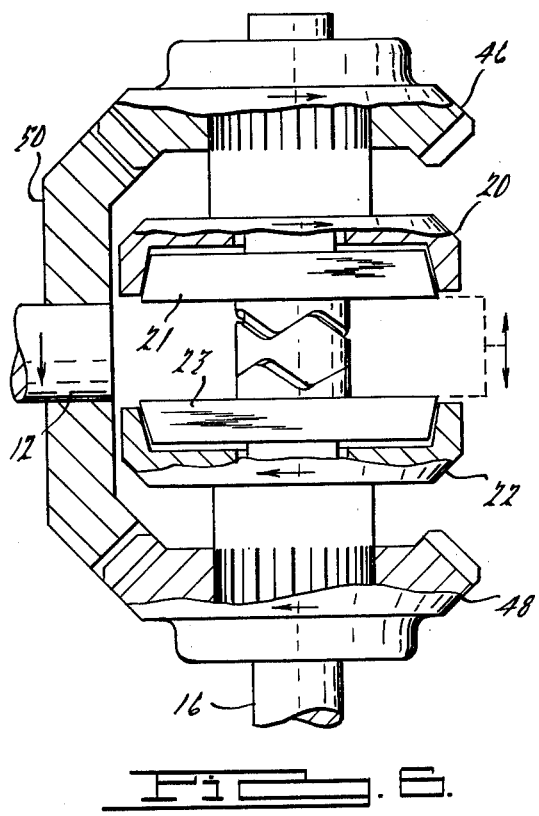
FIG. 6 is a side elevational view in section showing an alternate embodiment of a reversing clutch embodying features of the invention and also showing both the helical surfaces of the shaft and male cone member in a neutral condition and the conical surfaces of the female and male cones in a neutral condition.
Figure 7:
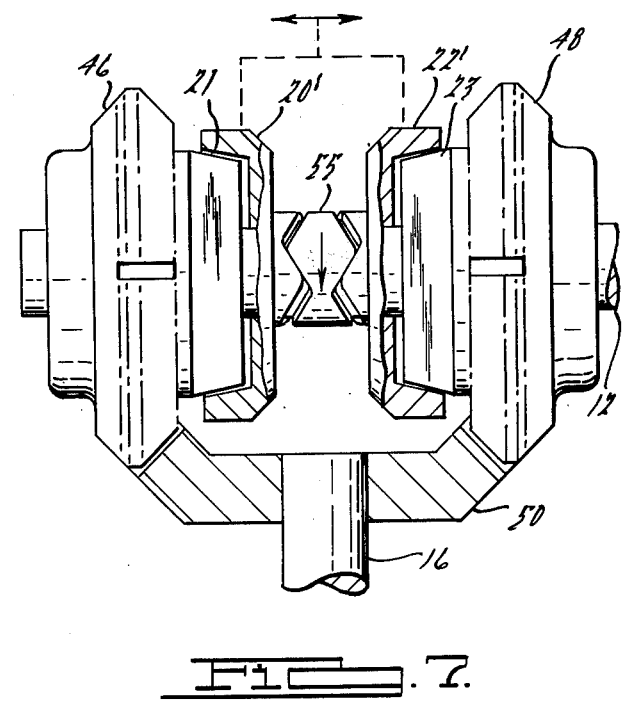
FIG. 7 is a side elevational view in section of another embodiment of the invention showing the helical surfaces on abutting portions of the female cone members and the input shaft.

With such an arrangement male cone members 21 and 23 may be readily placed in a neutral condition relative to the female cones by axial movement of means 30, as shown in FIGS. 6 and 7, for example. Also, either of the male cone members may be selectively brought into contact with its mating female cone member to provide a forward or reverse output driving condition from the clutch. A driving condition is illustrated in FIG. 1 which shows male cone 21 contacting female cone 20 to provide a forward condition (arbitrarily selected) for output shaft 16.

The rotation of output shaft 16 is provided by interaction between three gears. A pair of spaced relatively rotatable gears 46 and 48 are carried in an axially fixed position on input shaft 12 while the third gear 50 is placed between the first two gears so as to constantly intermesh with them. "Axially fixed" means that the gears should be substantially fixed. Slight movement such as on the order of 0.010 inch is acceptable. Gear 50 is secured to shaft 16 for rotation therewith. Gears 46 and 48 although substantially axially fixed on shaft 12 are freely rotatable thereon with their mated female cones 20 and 22, respectively, to which they are connected, whereby rotation of either gear causes rotation of gear 50 and hence rotation of output shaft 16.

In the embodiment shown in FIGS. 1 and 2 gears 46 and 48 are driven by the respective female cone to which they are affixed. Each gear is placed on shaft 12 adjacent a side of the respective female cone which is opposite the female cone side to which the male cone is adjacent. In other words, each female cone is positioned between a male cone and one of the rotatable gears 46 or 48.

Driving interconnection for coaction between shaft 12 and male cone members 21 and 23 is provided by sets of complementary radially distributed overlapping helical camming surfaces, generally designated at 51, 52, 53 and 54. Helical surfaces 52 and 53 constitute the opposite end surfaces of drive member or annulus 55 carried on and fixed to shaft 12. Annulus 55 may be integral with the shaft or merely affixed thereto. Helical surfaces 51 are end surfaces on male cone member 21 and helical surfaces 54 are end surfaces on male cone member 23. The helical end surfaces in sets 51–52 and 53–54 on adjacent end of the male cones and shaft annulus 55 are cylindrical and abutting as shown. As shown in FIGS. 1 and 2, it is preferred that at least three driving or active helical surfaces be provided on the ends of each member of each set. However, two per member or more are acceptable.

For the embodiment shown in FIGS. 1 and 2, the spiral direction of the helical surfaces is in an opposite direction for each set 51–52 and 53–54, i.e., the helical surfaces are "opposite handed" to provide the coaction resulting in opposite directions of rotation of output shaft 16 depending on which set is driving gear 50 for a given direction of rotation of input shaft 12.

As is illustrated in FIG. 2, the helical surfaces may be symmetrical and alternate surfaces in each set may be used to obtain "opposite handedness". Thus, in FIG. 2, assuming shaft 12 rotation as indicated by the arrow, helical surfaces 51–52 coact to drive male cone 21, female cone 20 if engaged by 21, gear 46 in the direction indicated by the arrows thereon and hence gear 50 is driven in a first direction. Again, assuming rotation of shaft 12 in the direction indicated, helical surfaces 53–54 coact to drive male cone 23, female cone 22 if engaged by 23 and gear 48 in the direction indicated by the arrows thereon and hence gear 50 is driven in an opposite direction. On the other hand, due to the symmetrical arrangement of the surfaces, flipping cone 21 180° will allow it to function as male cone 23 with female cone 22 and vice versa with respect to male cone portion 23.

Since each set of helical surfaces are constantly overlapping over the entire extent of the axial travel of male cones 21 and 23 relative to fixed annulus 55, constant driving engagement between male cones 21 and 23 and shaft 12 is readily provided when a male cone engages a female cone and is then brought into contact with helical surfaces on the annulus as shaft 12 rotates against the lagging movement of a male cone. Interaction of the helical surfaces upon rotation of shaft 12 also provides a positive force which urges the male cone against the corresponding female cone to improve the coupling action therebetween.

Each of the gears 46 and 48 rests between and against a pair of thrust washers 56 and 58, respectively, on shaft 12. The thrust washers in turn may rest against a suitable means such as a set of bearings and races 60 and 62 or the like. The thrust washers may be fixed to shaft 12 and rotate with it.

Also, thrust washer 58, which is at the end of shaft 12, is especially adapted to cause circulation of the lubricating oil in which the clutch is operated inside housing 11. The oil is circulated to various clutch members on the shaft by the thrust washer. This is accomplished by providing thrust washer 58 with paddle-like extensions 64 which, upon rotation of washer 58, push the oil rearwardly of the end of shaft 12 through conduits 66 in housing 11 and into cavity 68 as indicated by the arrows in FIG. 1. Shaft 12 is provided longitudinally with a hollow center portion 70 and also with a plurality of spaced radiating conduits 72 extending therefrom to the outside surface of the shaft for allowing oil to flow from cavity 68 through hollow portion 70 of shaft 12 and then outwardly to various locations along the shaft to the clutch members as indicated by the arrows in FIG. 1. Various clutch members may also be provided with oil passages if desired.

The clutch embodiment described above operates as follows: As is common, the rotary output of an engine is normally in one given direction. Thus, rotation of shaft 12 will be unidirectional, for example, in the direction indicated by the arrow on shaft 12 in FIG. 1. It follows that annulus 55 will be unidirectional in rotation also and will rotate with input shaft 12 in the same direction, again as is indicated by the arrow thereon in FIG. 1. Axial movement of male cone 21 into contact with female cone 20 as shown in FIG. 1 causes rotation of gear 46 through the engaged overlapping helical surfaces 51-52 and rotation of meshing gear 50 and output shaft 16 in a first rotary direction as is indicated by the various arrows in FIG. 1. During this action, gear 50 causes gear 48 and female cone 22 to idle on shaft 12.

If male cone 21 is moved away from female cone 20 and male cone 23 placed in contact with female cone 22, rotation of gear 48 occurs in the same direction as that of the previous rotation but since gear 50 remains in mesh with gear 46, gear 46 and cone 20 rotate in the opposite direction.

Engagement and disengagement between the conical surfaces of the female cones and the male cones is facilitated by making the conical angles thereof slightly different to obtain a slight mismatch therebetween.

FIGS. 6 and 7

Other arrangements of the clutch members are possible. For example, in FIG. 6, the clutch members are arranged vertically on the output shaft 16 and the intermeshing gear 50 is placed on the input shaft 12 to function as an input gear which drives the two gears 46 and 48 on output shaft 16. A neutral condition may be obtained as before by positioning the male cones intermediate both female cones. In this arrangement the helical surfaces of both sets are arranged in the same spiral direction rather than being opposite handed as in the other embodiment.

The embodiment shown in FIG. 7 demonstrates that the male and female cone members may be interchanged. In such an embodiment, the helical surfaces of annulus 55 engage helical surfaces on two female cone portions 20' and 22'. The female cone portions are axially movable to engage one or the other of two male cones 21 and 23, respectively.

What is claimed is:

1. In combination:
   a first rotatable shaft and a second rotatable shaft;
   a pair of spaced relatively rotatable gears substantially axially fixed on one of the shafts for rotation thereon;
   a third gear secured to the other of the shafts for rotation therewith and in constant mesh with the pair of spaced gears;
   a first pair of rotary clutch elements positioned on the one shaft between the pair of spaced gears, one of each of the clutch elements being secured to one of each of the spaced gears and rotatable therewith.
   a second pair of rotary clutch elements positioned on the one shaft between the first pair of clutch elements whereby each of the second pair of elements is adjacent one of the corresponding elements of the first pair and adapted for clutching engagement therewith, each of the clutch elements of the second pair being partially rotatable and axially reciprocable on the shaft;
   shift control means interconnecting the clutch elements of the second pair for coordinating and controlling their reciprocating movement and axial position on the shaft whereby one or the other of the clutch elements of the second pair may be moved along the shaft into engagement with its correspondingly adjacent clutch element of the first pair and both of the clutch elements of the second pair may be simultaneously moved on the shaft to a position which is spaced from the clutch elements of the first pair;
   a drive member positioned between the clutch elements of the second pair and secured to the one shaft for rotation therewith, the member having opposite ends positioned adjacent each of the clutch elements, respectively;
   first means comprising two sets of helical camming surfaces, each set being radially distributed about the one shaft and rotatable and reciprocable with one of the clutch elements of the second pair and extending therefrom toward one of the ends of the drive member, and
   second means comprising another two sets of helical camming surfaces, each set being radially distributed about one of the ends of the drive member and about the shaft and rotatable with the drive member about the shaft, each set extending toward and overlapping with one of the sets of the other helical surfaces and complementary therewith, whereby reciprocation of one of the clutch elements of the second pair to cause engagement with the adjacent clutch element of the first pair during rotation with the reciprocated clutch member, or the drive member on the shaft, causes engagement between the corresponding helical surfaces thereof and rotational movement is transferred between the shafts and the clutch members.

2. The combination of claim 1 as a cone clutch wherein the rotary clutch elements comprise two pairs of oppositely coned male and female cone elements.

3. The combination of claim 2 wherein the first pair of clutch elements comprise the female cones.

4. The combination of claim 2 wherein the second pair of clutch elements comprise the female cones.

5. The combination of claim 1 wherein the spaced gears are carried on the first rotatable shaft which comprises an input shaft.

6. The combination of claim 1 wherein the spaced gears are carried on the first rotatable shaft which comprises an output shaft.

7. The combination of claim 1 wherein the one shaft includes means for distributing lubricating oil between the various elements and members of the combination.

8. The combination of claim 7 including rotary impeller means movable with the shaft for circulating the oil.

* * * * *